June 22, 1971  A. WAHL  3,585,666
APPARATUS FOR THE MANUFACTURE OF SLOTTED FASTENERS
Filed March 14, 1968
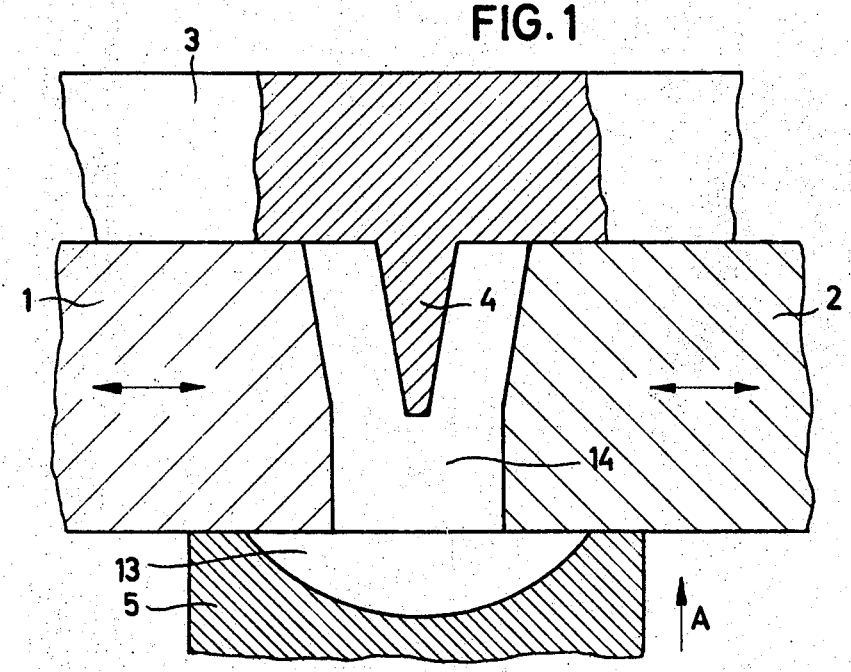
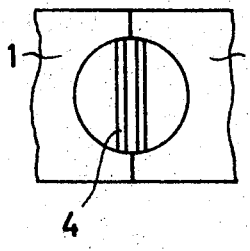
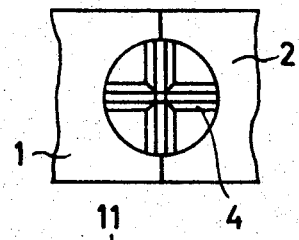
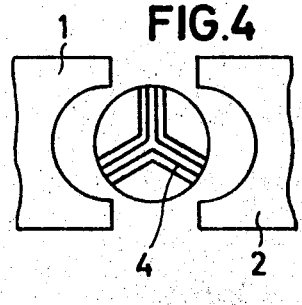
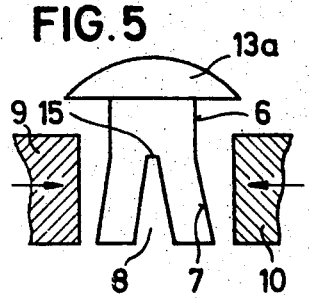
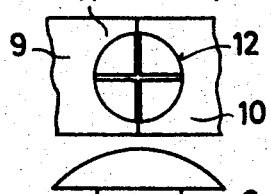
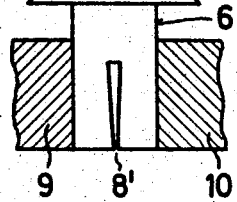
INVENTOR.
Artur Wahl
BY Hall, Pollock & Vande Sande
Attorneys June 22, 1971  A. WAHL  3,585,666
APPARATUS FOR THE MANUFACTURE OF SLOTTED FASTENERS
Filed March 14, 1968  3 Sheets-Sheet 2
FIG. 8
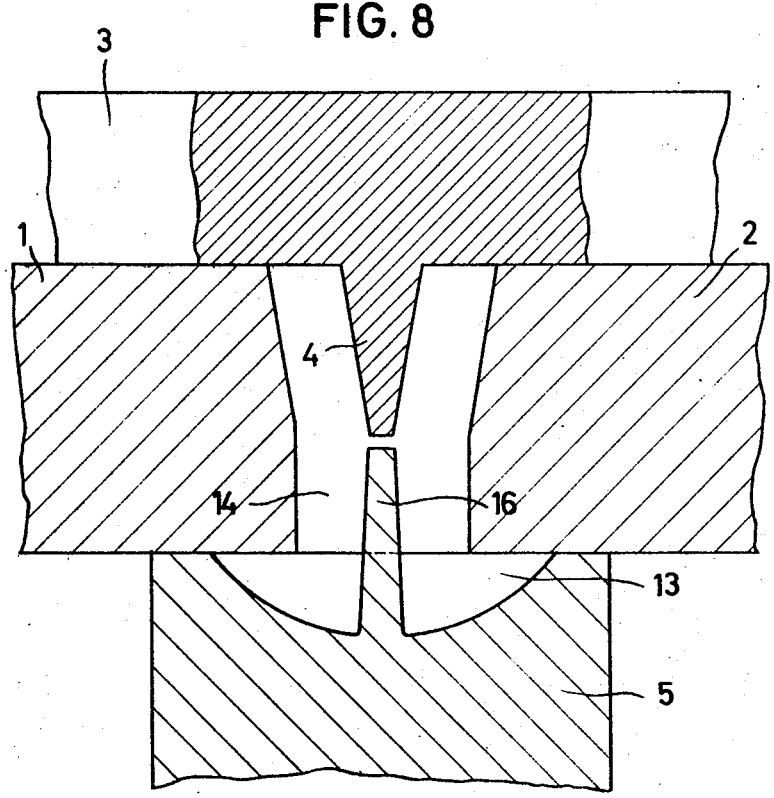
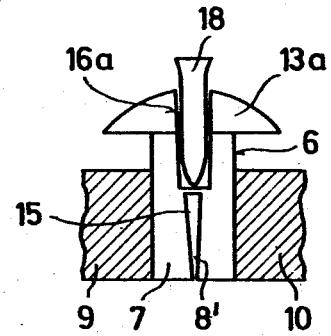
FIG. 9
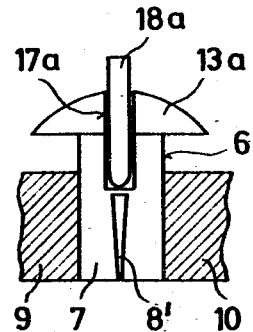
FIG. 10
INVENTOR.
Artur Wahl
BY Hall, Pollock & Vande Sande
Attorneys INVENTOR.
Artur Wahl
BY Hall, Pollock & Vande Sande
Attorneys United States Patent Office 3,585,666
Patented June 22, 1971

3,585,666
APPARATUS FOR THE MANUFACTURE OF SLOTTED FASTENERS
Artur Wahl, Schnaittenbach-Offenbach, Germany, assignor to Kerb-Konus-Gesellschaft Dr. Carl Eibes & Co., Schnaittenbach-Offenbach, Germany
Filed Mar. 14, 1968, Ser. No. 713,195
Claims priority, application Germany, Mar. 18, 1967, E 33,634
Int. Cl. B21k 1/58; B23g 9/00
U.S. Cl. 10—24
4 Claims

ABSTRACT OF THE DISCLOSURE

A workpiece is placed in a shaping die set adapted to form a fastener head and shank having one or more internal slots extending inwardly from the free end of the shank. Each such slot has an interior relatively narrow base and diverging sides which widen from the base toward the free end of the shank. The shank also has outwardly diverging lugs spaced from one another by said slot or slots. The shaped workpiece is removed from the die set, and the diverging lugs are then compressed toward the axis of the shank to reduce the diameter of the slotted shank section, and to render the slot sides essentially parallel, or converging to one another. The die set may also include a special head forming die adapted to produce a central recess extending through the fastener head and along the shank toward the internal slots.

BACKGROUND OF THE INVENTION

The present invention relates to a process and apparatus for the manufacture of fasteners having shanks provided with narrow slots. The process is particularly suitable for the manufacture of metal fasteners such as blank rivets or spreader rivets, but is also capable of use to form slotted pieces fabricated of synthetic materials.

In the manufacture of various slotted workpieces, e.g., rivets, it is customary to form narrow slots in certain types of such rivets by a cutting operation, e.g., employing a suitable milling machine. The slots so formed are relatively narrow, and may have a width of for example, 0.5 mm. When such a cutting operation is employed for slotting purposes, the slots are cut diametrically across the shank. Such cutting operations thus have the disadvantage that the slotted ends of the shank is necessarily divided into an even number of lugs; and known cutting operations are incapable of dividing the shank into an odd number of lugs. Known cutting processes have further serious disadvantages. The strength of the shank is significantly reduced because the structural lines of the shank, for example a rough-forged shank, are cut and intersected by the milling operation. Moreover, milling operations are relatively costly due to the complex machinery which must be employed, and the comparatively long period of time which is required for any cutting operation. In addition, known cutting operations involve problems of chip removal, as well as the need to provide cooling agents when relatively rapid milling operations are to be effected.

The present invention is directed toward a process and apparatus which overcomes all of these known disadvantages of slot cutting operations, and is intended to permit the fabrication of slotted workpieces wherein the slots are formed by shaping rather than cutting operations.

SUMMARY OF THE INVENTION

When a cutting operation is employed to slot the shank of a fastener, the slot formed in the shank by such a cutting operation exhibits parallel internal edges. The fastener art has, in the past, normally considered that such parallel edged slots cannot be produced by a shaping operation, and must necessarily be formed by a cutting operation. The present invention, however, provides a completely new technique wherein shaping can indeed be employed to produce parallel edged slots. The technique is, in fact, such that, where desired, slots may be formed which actually narrow toward the free end of the shank.

In its broadest aspects, the process of the present invention contemplates the die-shaping of a workpiece to produce a fastener shank having an interior slot which widens toward the free end of the shank, with the exterior of said shank also being shaped to provide spaced diverging lugs extending toward the free end of the shank. After this die-forming step is completed, the shank of the workpiece is subjected to a further forming operation wherein the diverging lugs of the shank are compressed in a generally radial direction so that the diameter of the slotted shank region is reduced to the overall diameter of the non-slotted shank portion, or to an even lesser diameter. During this further forming operation, the die-formed diverging slot in the workpiece is altered in cross-sectional shape so as to exhibit parallel sides, or, indeed, to exhibit interior sides which converge toward the free end of the shank.

The initial shaping operation may be effected by a die set having special cooperating sections for simultaneously forming the slotted interior, and the tapered or diverging exterior, of the fastener shank. The die set may, moreover, employ a further die section adapted simultaneosuly to form to fastener head integral with the slotted and shaped fastener shank. The head forming die section of the die set is preferably located below the shank forming die sections of said set so that, upon completion of a forming operation, the formed workpiece may be released to fall from the die set under the influence of gravity, thereby eliminating the need for a separate ejection or extraction mechanism or step. The head forming die section of the set may, moreover, include an integral or separate forming element adapted to produce an elongated cylindrical or conical recess extending through the head and along the shank of the fastener toward the slotted portion of said fastener. Such an axially extending recess is needed in spreader rivets to permit the rivet to later be installed by driving a tool along the axis of the fastener to spread the shank. Prior art techniques have formed such axially extending recesses by a separate boring or drilling operation; and the special head forming techniques of the present invention, when employed, thus effect a still further simplification in manufacture.

In a specific embodiment, the die set comprises a plate having one or more protrusions of tapered configuration adapted to form the interior shank slots, a further die section adapted to form the head of the fastener, and two or more shank-forming die sections disposed between the shank-slotting and head-forming die sections. The shank-forming die parts are adapted to shape the outer surface of a workpiece to form the fastener shank, and are movable relative to one another, e.g., in a radial direction.

In operation, an appropriately shaped workpiece is placed between the various die sections described, and the shank-forming sections of the die are appropriately positioned relative to one another and relative to the shank-slotting section of the die. The head-forming portion of the die is then moved under appropriate pressure, or in an appropriate impacting operation, toward the shank-slotting section of the die. After the fastener has been formed, the head-forming section of the die, which is preferably located at the lowermost portion of the die set, is moved out of the way; and the shank-forming sections of the die are moved away from one another. The formed blank rivet then drops out of the die by means of gravity. The die-shaped fastener is then further formed by placing the slotted shank between relatively movable forming slides, and then moving said slides toward one another to compress the exterior of said slotted shank toward the longitudinal axis of the fastener. This further operation reduces the diameter of the slotted portion of the shank and, simultaneously, reshapes the interior slots in said shank.

BRIEF DESCRIPTION OF THE DRAWINGS

FIG. 1 is a diagrammatic vertical cross-sectional view of a die set constructed in accordance with one embodiment of the present invention, and useful in the practice of the novel process of the present invention;

FIG. 2 is a plan view of a portion of the die set of FIG. 1 showing one form of slot forming protrusion which can be employed in the present invention;

FIG. 3 is a view similar to FIG. 2 showing another form of slot forming protrusion which can be employed in accordance with the present invention;

FIG. 4 is a view similar to FIG. 2 showing still another form of slot forming protrusion which may be employed in accordance with the present invention;

FIG. 5 is a diagrammatic view of a rivet fabricated by the apparatus of FIG. 1, and also illustrates an additional forming apparatus for achieving a further step in the forming process;

FIG. 6 is a view similar to FIG. 5 showing a completed rivet configuration, and the further forming step of the process;

FIG. 7 is an end view of the rivet and forming apparatus shown in FIG. 6;

FIG. 8 is a diagrammatic vertical cross-sectional view of a die set similar to that shown in FIG. 1, but employing a modified head-forming die section;

FIG. 9 shows a completed rivet of the type which may be fabricated by the apparatus of FIG. 8, and further illustrates the manner in which said rivet may later be installed;

FIG. 10 is a view similar to FIG. 9, showing a completed rivet of modified form, and its manner of installation;

DESCRIPTION OF THE PREFERRED EMBODIMENTS

Figure 12:
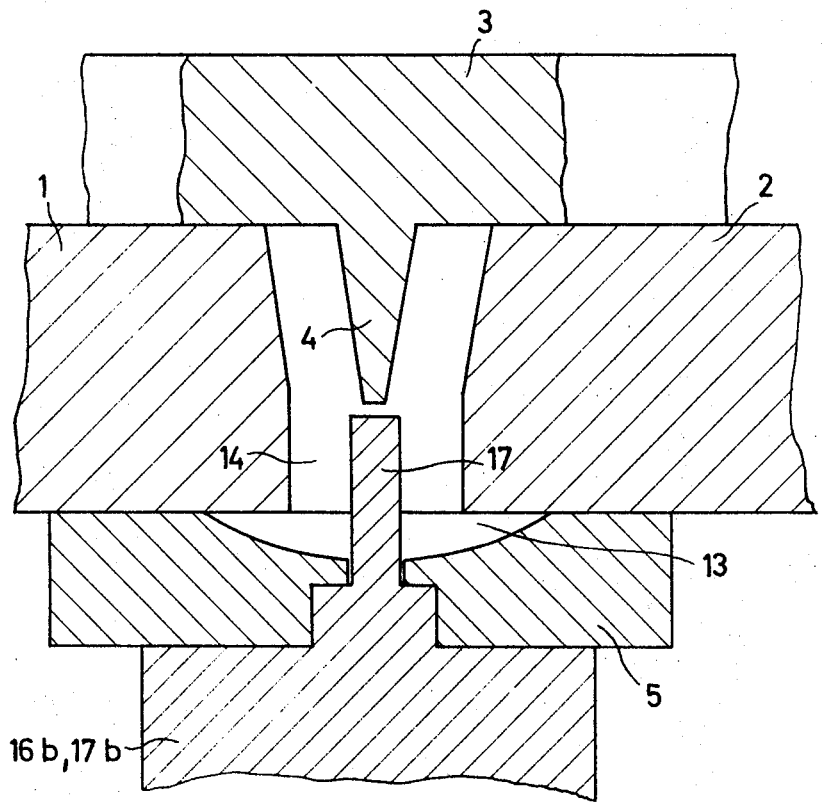
FIG. 12 is a diagrammatic vertical cross-sectional view similar to FIGS. 1 and 8 showing still another type of head-forming die section which may be employed.

Referring initially to FIG. 1, it will be seen that a die set constructed in accordance with one embodiment of the present invention, and utilized to practice the novel process of the present invention, may comprise a pair of shank-forming die-halves 1 and 2 mounted for movement in appropriate slides (not shown) and adapted to be moved relative to one another generally in the direction of the arrows shown in FIG. 1. The two die-halves 1 and 2 are depicted in FIG. 1 in their closed position, and are adapted to envelop the shank portion of a workpiece in lateral directions for forming the exterior of a fastener shank. Shank-forming die sections 1 and 2 cooperate with a shank-slotting section of the set comprising a plate 3 having a slot-producing protrusion 4 extending into the space 14 bounded by the composite forming surface of die halves 1 and 2. Protrusion 4 is of a tapered or diverging configuration as illustrated. The adjacent forming surfaces of die halves 1 and 2 are similarly diverging, being inclined in directions generally parallel to the tapered sides of protrusion 4. As a result, the hollow space 14 conforms to the shape of the shank shown in FIG. 5. The overall configuration of these parts is thus adapted to produce a fastener shank having a plurality of lugs 7 disposed in spaced diverging relation to one another adjacent the free end of the shank, with said shank further defining an interior slot 8 which is also of tapered outwardly diverging configuration.

The die assembly of FIG. 1 further includes a head-forming section 5 provided with a hollow space 13 which conforms to the shape of the rivet head to be manufactured. In a preferred embodiment of the invention, head-forming section 5 of the die set is located at the bottom of the die assembly. By this arrangement, once the fastener is fully formed, the head forming section 5 can be moved away, or to one side, and the die halves 1 and 2 separated, so that the formed fastener falls from the set under the influence of gravity. All of the components 1 through 5 inclusive should, of course, be designed and dimensioned in such manner that they can withstand the bearing pressures which occur during the die-forming of a blank.

In utilizing the apparatus of FIG. 1, the die parts 1 and 2 are positioned inwardly relative to one another, and relative to plate 3; and the parts 1, 2 and 3 are then firmly locked in place. An appropriately cut blank is then fed into the die set. The head-forming portion 5 of the die set is then moved in the direction A so that die element 5 forms the head of the fastener, die elements 1 and 2 form the exterior of the shank, and die elements 3, 4 simultaneously form one or more interior slots 8 (see FIG. 5) extending inwardly of the free end of said shank. The interior slots 8 so formed in the shank of the fastener are tapered in cross section, and widen from a base 15 (FIG. 5) toward the free end of said shank. The slotted end of the shank, so formed, includes spaced, slightly diverging lugs 7 which extend in directions generally parallel to the interior sides of the slot or slots 8.

As soon as this shaping operation is completed, the head-forming portion 5 of the die is withdrawn downwardly, or to one side, and the two die halves 1 and 2 are opened in lateral directions. The die-formed rivet is thereby released and drops from the die set. Obviously, it is entirely feasible to arrange the die set in such manner that the head-forming portion 5 is located at the top of the set. However such a design requires the addition of some appropriate ejector assembly to remove the formed fastener from the opened die set.

The tapered protrusion 4 shown in FIG. 1 may take various configurations. As shown in FIG. 2, a single tapered protrusion can be provided extending completely across the space bounded by the forming surfaces of elements 1 and 2, to form an essentially diametric internal slot in the shank. In the alternative, the protrusion 4 may take a form similar or analogous to that shown in FIG. 3 so that the internal slots 8 are positioned in a cruciform or star configuration, sub-dividing the shank into any desired even number of lugs 7. The protrusion 4 may also take a form similar or analogous to that shown in FIG. 4, subdividing the shank into any desired odd number of lugs.

In all cases, however, the protrustion 4 acts to form one or more slots which have an interior relatively narrow base 15 (see FIG. 5) and diverging sides opening into the free ends of the shank. Base 15 may be of flattened configuration, as illustrated in FIG. 5. In the alternative, protrusion 4 may be so designed that the base 15 is formed with a rounded configuration.

FIGS. 2 and 3 also illustrate the die halves 1 and 2 in their closed position. FIG. 4 illustrates the positions of the die halves 1 and 2 when they have been opened for release of the formed shank.

After the workpiece has been shaped by the assembly of FIG. 1, and removed therefrom, the fastener is further shaped by applying compressive forces to the slotted portion of the fastener shank, i.e., to lugs 7. More particularly, as shown in FIG. 5, a fastener shaped by the structure of FIG. 1 (and illustrated in the form of a spreader rivet) may have a head 13a, a cylindrical unslotted shank part 6, and a conically widened slotted shank part comprising diverging lugs 7 separated by one or more internal slots 8 which widen toward the free end of the shank. The slotted shank portion of a fastener so formed is then disposed between a pair of relatively movable forming slides 9 and 10. FIG. 5 shows forming slides 9 and 10 in their open position, while FIGS. 6 and 7 show the forming slides in their closed position. Forming slides and 10 are provided with curved surfaces 11 and 12 respectively, having radii of curvature substantially matching the diameter of the unslotted shank portion 6.

When the two forming slides 9 and 10 are moved into the closed position shown in FIGS. 6 and 7, lugs 7 are compressed inwardly and the diameter of the slotted portion of the shank is reduced so as not to exceed the diameter of the unslotted portion 6 of said shank. At the same time, tapered slots 8 are closed to some extent so that slots of a new shape 8' are produced. The actual form of slot 8' shown in FIG. 6 is one wherein the slot sides actually converge from the slot base toward the free end of the shank. However, it will be appreciated that the further forming step may be so practiced that the interior sides of the final slot 8' are parallel if desired.

By the steps described above, i.e., the die-shaping of a shank with tapered or outwardly diverging slots, followed by compression of the slotted portion of the shank to reform the slots, very narrow interior slots of any desired cross-sectional shape may be provided in fasteners such as spreader-rivets without the need of any cutting operation.

FIG. 8 shows a modification of the apparatus of FIG. 1, adapted to punch an axially extending recess through the head and along the unslotted portion of the shank at the same time that the shank slots are being formed. The parts 1, 2, 3, 4, 5, 13, and 14 shown in FIG. 8 correspond to the items having like numerals already described in reference to FIG. 1. The head forming porion 5 of the die set may, in addition, be provided with an integral peg 16 shaped in the form of a truncated cone, and adapted to punch a recess centrally through the head 13a of the workpiece during the die-forming operation. It will be noted that the peg 16 is so positioned that it terminates closely adjacent to but spaced from the protrusion 4 of the slot forming portion of the die set. As a result, a blank rivet formed by the apparatus of FIG. 8 has a centrally extending recess 16a (see FIG. 9) which terminates within the body of the fastener just short of the base 16 of the slot 8'.

FIGS. 9 and 10 are similar to FIG. 6, and depict the further forming step employing forming slides 9 and 10. In addition, FIGS. 9 and 10 depict two forms of rivets which can be fabricated by apparatus of the type shown in FIG. 8. The rivet shown in FIG. 9 has a generally conical recess 16a extending through the head 13a thereof; and such a rivet may be associated with a drive and spreader pin 18, also of conical configuration, for use in known manner to later spread apart lugs 7 of the rivet when the rivet is being installed. In the arrangement of FIG. 10, the axially extending recess is designated 17a, and this recess is of generally cylindrical configuration. Such a recess can be associated with a drive and spreader pin 18a, of cylindrical configuration, for purposes similar to pin 18 already described. In both cases, the pins 18 and 18a are preferably provided with ends which have a more or less pointed configuration, adapted to pierce the base 15 of the slotted shank during the installation operation.

Figure 11:
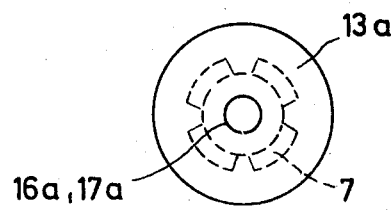
FIG. 11 is a plan view of the head portion of the rivets shown in FIGS. 9 and 10.

FIG. 11 is a plan view of the rivets shown in FIGS. 9 and 10 from the head end of said rivet, and depict the rivet shank as being provided with four lugs 7 which are spread outwardly. It will be appreciated that FIG. 11 thus illustrates the form of rivet which is produced by the apparatus of FIG. 8, and also depicts the form which the rivet will take after installation when the pin 18 or 18a is driven along the axis of the fastener.

FIG. 12 shows still another die set similar to those of FIGS. 1 and 8, but utilizing a modified type of head-forming die. In the arrangement of FIG. 12, the axial recess extending through the head of the fastener is formed by a peg 17 of cylindrical configuration, as opposed to the conical peg 16 of FIG. 8. It will be appreciated, of course, that the peg 16 of FIG. 8 may be cylindrical rather than conical and, by the same token, the peg 17 of FIG. 12 may be conical rather than cylindrical. Peg 17 of FIG. 12 is not integral with head-forming portion 5 as in FIG. 8, but is formed as a separate element protruding from an enlarged shaft 16b, 17b and extending through an appropriate aperture in die 5. By this arrangement, after the die-shaping of the rivet is completed the peg 17 and its associated shaft 16b, 17b can be first removed from the die set so that the shaped rivet is supported by the head-forming die section 5 alone; and the die assembly may then be opened up in the manner already described in reference to FIG. 1.

Spreader and blank rivets as well as other fasteners produced in accordance with the present invention have a very substantial advantage over fasteners slotted by a cutting operation, in that fasteners formed by the present invention possess a very homogeneous structure. As a result, fasteners formed by the present invention are subject to much less tear at the slot base when they are being installed. Furthermore, from the point of view of mass producing rivets and similar such fasteners, manufacturing costs are greatly reduced, and the actual manufacturing process is substantially simplified. The first step of the new process directly forms a rivet blank with a full cylindrical shank of known type, and the rivet blank is already slotted so that, but for the increased diameter of the slotted shank portion, the rivet could be immediately installed in place. The second step of the new process comprises a simple compression step. This is a far less costly operation than slot-cutting, the second step used heretofore in the formation of rivets of the types here contemplated, and can be performed much more rapidly to produce a far higher rate of output than has been the case in prior art fabrication methods.

As a result of all the above factors, spreader or blank rivets, or similar such articles, of improved physical characteristics can be mass produced faster, and at less cost, than has been possible in the past. These factors are, moreover, accompanied by substantial savings in the amount of material required to manufacture any given rivet, and by simplifications in the manufacturing process which are accomplished through elimination of chip removal problems and the need for cooling agents, which problems are characteristic of known milling or other cutting operations.

When blank rivets are produced by the modified apparatus and process of FIGS. 8 and 12, moreover, one step of prior art methods is completely eliminated, i.e., the boring of a blind-end bore such as 16a, 17a through the rivet head. However, rivets fabricated in accordance with the process of FIGS. 1, 5 and 6 can later be subjected to such a prior art drilling or bore step, and the overall savings are still significant.

While I have thus described preferred embodiments of the present invention, many variations will be suggested to those skilled in the art. It must therefore be emphasized that the foregoing description is intended to be illustrative only and not limitative of my invention; and all such variations and modifications as are in accord with the principles described are meant to fall within the scope of the appended claims.

Having thus described my invention, I claim:

1. A die-forming apparatus for the fabrication of a rivet having a partially slotted shank comprising a plurality of shank-forming die sections mounted for movement toward and away from one another, said movable die sections having first forming surfaces movable relative to one another and cooperating with one another to define a first shank-forming portion of generally cylindrical configuration, said die sections also having second forming surfaces movable relative to one another and diverging from said first forming surfaces to define a second shank-forming portion inclined to and coaxial with said generally cylindrical shank forming portion, a slot-forming die plate overlying one end of said coaxial shank-forming portions of said movable die sections, said die plate having at least one protrusion of tapered cross section extending into the region surrounded by said second forming surfaces, said tapered protrusion having external walls extending substantially parallel to said diverging second forming surfaces, a head-forming die plate overlying the other end of said coaxial shank-forming portions of said movable die sections, said head-forming die plate being positioned below said shank-forming die sections, and means for moving said head-forming die section away from said other end of said coaxial shank-forming portions, and for moving said shank-forming die sections away from one another, to free a formed fastener from the forming surfaces of all said die sections thereby to permit the formed fastener to drop freely from said die-forming apparatus under the influence of gravity.

2. The apparatus of claim 1 wherein said head-forming die plate includes a peg extending along the central axis of said coaxial shank forming portions toward said tapered protrusion.

3. The apparatus of claim 2 wherein said peg is integral with said head-forming die plate.

4. The apparatus of claim 2 wherein said peg comprises a separate die component extending through said head-forming die plate and movable relative to said head-forming die plate.

References Cited

UNITED STATES PATENTS

| | | | |
|---|---|---|---|
| 666,092 | 1/1901 | Fox | 10—27 |
| 896,433 | 8/1908 | Burns | 10—27 |
| 1,466,244 | 8/1923 | Noble | 10—27 |
| 1,561,863 | 11/1925 | Kuhne | 10—27 |
| 3,445,870 | 5/1969 | Kolec | 10—27 |
| 1,793,646 | 2/1931 | Stimpson | 10—20.5 |
| 942,226 | 12/1909 | Vernon et al. | 151—31 |
| 2,543,063 | 2/1951 | Rodgers | 10—27 |
| 2,586,336 | 2/1952 | Huck | 10—27 |
| 2,588,404 | 3/1952 | Muenchinger | 10—27 |
| 2,843,861 | 7/1958 | Gandy | 10—27 |
| 2,843,928 | 7/1958 | Gandy | 10—27 |
| 2,887,694 | 5/1959 | Sauter | 10—27 |
| 2,716,759 | 9/1955 | Merlin et al. | 10—26 |

FOREIGN PATENTS

| | | | |
|---|---|---|---|
| 12,468 | 10/1886 | Great Britain | 151—31 |

RICHARD J. HERBST, Primary Examiner

E. M. COMBS, Assistant Examiner